UNITED STATES PATENT OFFICE.

CHARLES COLAHAN, OF CHICAGO, ILLINOIS.

PROCESS OF DEGUMMING FIBROUS PLANTS.

No. 833,507.         Specification of Letters Patent.         Patented Oct. 16, 1906.

Application filed April 21, 1906. Serial No. 312,969.

*To all whom it may concern:*

Be it known that I, CHARLES COLAHAN, a citizen of the United States, and a resident of Chicago, county of Cook, State of Illinois, have invented certain new and useful Improvements in Processes of Degumming Fibrous Plants and Producing Fiber Therefrom, of which the following is a description.

I am aware that various forms of treatment as substitutes for field retting and preparation of the fiber have been suggested; but the objections to their general use have been the liability of injury to the fiber and the great expense attending the applications and production of the retting compounds and the necessity of buildings and appliances specially adapted to the work, to which the straw must be transported and cared for.

In my experience of many years in the harvest-field I find the great quantity of flax and hemp straw for fibrous purposes as it is harvested in the field should be treated in the field to economically extract the fiber. It saves the risk and expense attending its removal and preserves its naturally parallel and uniform conditions for extracting the fiber, which is important, and the work is quickly done by my process without much more handling than is required in ordinary harvesting and eliminates the additional expense and time incurred in the old way of spreading and retting it upon the ground and the liability of loss or injury by unavoidable exposure to the weather.

By my process the straw is taken after cutting as soon as seasoned or cured in the field, shock or stack and subjected to a steaming process in open troughs or tanks containing a retting dissolving liquid obtained from the refuse waste product discharged from oil-refineries. This material or liquid contains elements adapted to dissolve the mucinous matter enveloping the fibers when properly applied with the aid of heat or steam. This liquid can be diluted or strengthened, as its condition or the nature of the plant requires.

The introduction of the steam heat into the tanks is through valve-controlled pipes emanating from connections with a traction-engine boiler that also furnishes power to run the braking-machine that separates the hurds from the fiber. Near and below the valve that admits the steam I place supplemental pipes to introduce a diluting or strengthening liquid, which is combined and mixed with the tank liquid by the steam, as required by the evaporation and waste or various conditions of the fiber.

The fibrous stalks are subjected to a boiling heat for twenty minutes, then removed and placed vertically in shocks in the field in open air, where they quickly drain and dry, in proper condition for braking. An ordinary farm traction-engine will furnish all the steam and power required to do the work and with the appliances used is readily removable in the field to any point desired.

The fiber is extracted more rapidly without waste or tow, retaining its full tensile strength and improving its condition in many ways, making a superior fiber for spinning purposes, and its product is not affected by the hydroscopic atmospheric conditions, and consequently is much more durable than the naturally retted fiber and is entirely free from hurds as it comes from the brake.

What I claim, and desire to secure by Letters Patent, is—

1. The process of degumming fibrous plants in the field, consisting in subjecting the stalks to a bath in open troughs containing a retting and dissolving liquid obtained from the refuse waste product of carbon-oil refineries properly blended, and heated to a boiling-point, from which the stalks are removed and placed in shocks in the open air, and when dried, submitted to the braking action that removes the hurds therefrom substantially as shown and described.

2. The process of treating or preparing fibrous plants, which consists in subjecting the same after harvest to a continuous uniform bath containing elements obtained from the waste products of petroleum adapted to dissolve the mucinous matter with the aid of heat, combined with means of introducing diluting or strengthening agents that are blended and forced into the bath by the steam injection as required by the various conditions of the fiber that is being subjected to the bath, from which the stalks are taken and placed in shocks in the open air, and when dried submitted to the braking action that removes the hurds therefrom.

3. In the process herein described of treating fibrous plants or stalks to the action of the above-stated liquid as described, which thoroughly dissolves the mucinous matter without injury to the fiber, and placing the same in shocks in the open field to dry and thereafter subjecting the same to the mechanical brake in the continuous preparation of the fiber.

CHARLES COLAHAN.

Witnesses:
M. H. COLAHAN,
E. N. TUTTLE.